3,410,683
PROCESS FOR THE PRODUCTION OF
SINTERED ARTICLES
Gerhard Zapf, Krebsoge, Rhineland, Germany, assignor to Sintermetallwerk Krebsoge G.m.b.H., Krebsoge, Rhineland, Germany
No Drawing. Filed Jan. 29, 1968, Ser. No. 701,081
4 Claims. (Cl. 75—214)

ABSTRACT OF THE DISCLOSURE

A process for the production of sintered articles of high density by pre-pressing metal powder to form a moulding and subsequently re-pressing the moulding in a pre-warmed press tool is characterised in that, in order to keep the re-crystallisation conditions of the article during re-pressing constant, the moulding is heated to a temperature of from about 750° C. to about 1100° C. before it is re-pressed and the press tool is pre-warmed to a temperature of from about 150° C. to about 350° C. and is maintained at its pre-warming temperature throughout the re-pressing operation.

---

In industry, metal articles are used to a great extent which are produced by pressing and sintering. Their utility frequently depends upon the fact that their physical properties, especially their strength, conform or approach as far as possible to the properties of parts produced from a fused mass. The physical properties of sintered metal articles are influenced to a considerable extent by the production process. Thus there is a logarithmic relation for all metals between the applied pressure and the density of the product. Only at low pressures does an increase of the pressure also bring a proportional increase of the density. At higher pressures on the other hand an increase of the pressure leads only to a relatively slight increase of the density. This is attributable to the fact that in the pressing of metal powders a cold work-hardening occurs which hinders the deformation resistance and thus the compressing operation and finally brings the latter to a halt. Especially in the case of powders of ductile metals, such as iron, copper, brass and bronze, this phenomenon can be observed very clearly. For this reason it is difficult to produce sintered parts of high density with pressures at which tool wear and tool breakage are kept within economically acceptable limits. This is a serious hindrance to the obtaining of strength properties which correspond to or come close to those of articles produced from a molten mass of metal.

Occasionally attempts have also been made to recompress cold pressings or finished sintered articles, brought to sintering temperature, in a cold or pre-warmed tool by rapid pressure application. A kind of forging process occurs in this case. It has not, however, been found possible repeatedly to achieve re-pressings with uniformly high densities, that is to say densities of more than 7.4 g./cc. This is explained by the fact that it was not recognised what decisive influence is attributable in this manner of working not only to the re-pressing temperature, but also to the temperature of the tool used for the re-pressing. In the re-pressing of a highly heated pre-pressed article, further heat is constantly supplied to the tool, which may already be pre-warmed, and this leads to a variation of the temperature of the tool and thus also of the recrystallisation conditions in the article, which involves a corresponding variation of its density and strength properties.

The aim of the present invention is to produce sintered articles of high density by pre-pressing of a moulding consisting of metal powder and re-pressing or re-shaping the heated moulding in a pre-warmed tool, and according to this invention, the pre-pressed moulding is heated for re-pressing or re-shaping to 750 to 1100° C., its re-pressing or re-shaping takes place in a tool which is pre-warmed to 150 to 350° C. and is kept at its pre-warming temperature until the end of the re-pressing or re-shaping operation.

The re-pressing or re-shaping may be followed by a sintering of the moulding at about 1250° C. Articles of high density can however also be produced without a separate sintering operation, for example from a mixture of 98% iron powder a pre-pressed moulding is produced, the moulding is heated to 800 to 1100° C. and is then re-pressed in a tool heated to 300 to 350° C. and kept at this temperature.

In every case it is essential for the process according to the invention that during the re-pressing operation, a constant temperature difference, which is to be adjusted appropriately, prevails between the article being re-pressed and the tool. This leads to constant recrystallisation conditions. This condition has a decisive effect above all in the case of mass production in which the pre-pressings must be re-pressed in rapid sequence in one and the same tool. The maintenance of the pre-warming temperature of the tool during the re-pressing is effected by regulated cooling. By means of the process in accordance with the invention it is readily possible to produce sintered parts having a constant density of more than 7.4 and up to 7.8 g./cc. This appears from the following examples:

EXAMPLE 1

From a mixture of iron powder with 1.5% copper powder, a moulding was pre-pressed with a density of 6.5 g./cc., the moulding was heated to a temperature of 900° C. and re-pressed in a tool, which was heated to 350° C. and kept at this temperature during the re-pressing operation, with a pressure of 5 kp./sq. cm. After this treatment the article achieved a density of 7.78 g./cc. After this treatment the material had a tensile strength of 48 to 52 kp./sq. mm. and an elongation at fracture of over 25%.

EXAMPLE 2

From a mixture of 95% industrial iron powder and 5% nickel powder, a moulding was pre-pressed with a density of 6.6 g./cc., then heated to 850° C. and re-pressed in this condition in a tool which was heated to 300° C. and kept at this temperature during the re-pressing operation. With a pressure of only 4 kp./sq. cm. a density of 7.78 g./cc., was achieved. After a sintering at 1250° C. the material had a tensile strength of 52 to 55 kp./sq. mm. and an elongation at fracture of 22 to 26%.

EXAMPLE 3

From a mixture of 98% iron powder and 2% graphite a moulding was pressed and heated without sintering to 1100° C. Re-pressing took place in a tool heated to 350° C. and kept at this temperature during the re-pressing operation. With a pressure of 5 kp./sq. cm. a density of 7.70 g./cc. was achieved. The material thereafter possessed a tensile strength of 42 to 48 kp./sq. mm. and a breaking elongation of 5 to 8%.

I claim:
1. In a process for the production of sintered articles of high density comprising the steps of pre-pressing metal powder to form a moulding and re-pressing said moulding in a pressing tool, the improvement comprising the steps of heating said moulding to a temperature of from about 750° C. to about 1100° C. before said re-pressing operation, pre-warming said press tool to a temperature of from about 150° C. to about 350° C. and maintaining said press tool at said prewarmed temperature throughout said re-pressing operation.

2. A process as claimed in claim 1, wherein said press tool is maintained at said pre-warming temperature by regulated cooling of said tool.

3. A process as claimed in claim 1, comprising the further step of sintering said article at about 1250° C. after said re-pressing operation.

4. A process as claimed in claim 1, wherein said moulding is heated to a temperature of from about 800° C. to about 1100° C. and said tool is pre-warmed to a temperature of from about 300° C. to about 350° C.

References Cited

UNITED STATES PATENTS

| 3,248,215 | 4/1966 | Bonis | 75—226 |
| 3,258,514 | 6/1966 | Roach | 75—226 |
| 3,268,330 | 8/1966 | Kendall | 75—226 |

BENJAMIN R. PADGETT, *Primary Examiner.*

A. J. STEINER, *Assistant Examiner.*